(12) United States Patent
Lee et al.

(10) Patent No.: US 7,634,469 B2
(45) Date of Patent: Dec. 15, 2009

(54) SYSTEM AND METHOD FOR SEARCHING INFORMATION AND DISPLAYING SEARCH RESULTS

(75) Inventors: Chung-I Lee, Taipei Hsien (TW);
Chien-Fa Yeh, Taipei Hsien (TW);
Yao-Huei Sie, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 93 days.

(21) Appl. No.: 11/842,167

(22) Filed: Aug. 21, 2007

(65) Prior Publication Data

US 2008/0168054 A1    Jul. 10, 2008

(30) Foreign Application Priority Data

Jan. 5, 2007    (CN)    ......... 2007 1 0200011

(51) Int. Cl.
*G06F 17/30* (2006.01)
(52) U.S. Cl. .................................................. 707/3
(58) Field of Classification Search .......... 707/1–6
See application file for complete search history.

(56) References Cited

U.S. PATENT DOCUMENTS

| | | | |
|---|---|---|---|
| 2006/0136400 A1* | 6/2006 | Marr | 707/3 |
| 2007/0061303 A1* | 3/2007 | Ramer et al. | 707/3 |
| 2008/0077570 A1* | 3/2008 | Tang et al. | 707/5 |
| 2008/0114756 A1* | 5/2008 | Konig et al. | 707/5 |

* cited by examiner

*Primary Examiner*—Diane Mizrahi
(74) *Attorney, Agent, or Firm*—Frank R. Niranjan

(57) ABSTRACT

A method for searching information and displaying search results is disclosed. The method receives one or more keywords, and obtains search results according to the one or more keywords. The search results include one or more documents. The method further confirms at least one cluster name according to the search results, and clusters each of the one or more documents in the search results into a corresponding cluster name. In addition, the method classifies each document in the search results into a corresponding field, and thus obtains classified search results. Finally, the method generates a cluster diagram according to the at least one cluster name and the clustered documents, generates a cluster-classification diagram according to the classified search results and the generated cluster diagram, and outputs the generated cluster-classification diagram.

6 Claims, 7 Drawing Sheets

SYSTEM AND METHOD FOR SEARCHING INFORMATION AND DISPLAYING SEARCH RESULTS

BACKGROUND OF THE INVENTION

1. Field of the Invention

The present invention relates to systems and methods for searching information, and more particularly, to a system and method for searching information and displaying search results.

2. Description of Related Art

Present-day systems or methods for searching information typically return search results of a user's search request with a list of information including titles, abstracts, and hyperlinks. The user is supposed to sift through this list and select particular titles that are actually relevant and interesting. Once the title is selected and clicked by the user, a corresponding document will be shown to the user.

For very large document collections such as the web page (HTML or XML document) collections, the returned search results typically consist of a large number of documents, the vast majority of which are of no interest to the user. For example, if a user searches GOOGLE for "computer", "virus", and "MP3", many disorderly and unsystematic documents are returned.

Obviously, it is very difficult and a great burden for the user to find information from hundreds of thousands of candidate documents, which are often heterogeneous in topics, genres, and quality.

What is needed, therefore, is a system and method which can search information and display search results for the sake of reducing labor intensity and enhancing work efficiency.

SUMMARY OF THE INVENTION

One preferred embodiment provides a system for searching information and displaying search results. The system includes a web server and a search server. The web server includes an inputting module and an outputting module. The search server includes an obtaining module, a confirming module and a generating module. The inputting module is configured for receiving one or more keywords. The obtaining module is configured for obtaining search results according to the one or more keywords, the search results comprising one or more documents. The confirming module is configured for confirming at least one cluster name according to the search results, and clustering each of the one or more documents in the search results into a corresponding cluster name, classifying each document in the search results into a corresponding field, and thus obtaining classified search results. The generating module is configured for generating a cluster diagram according to the at least one cluster name and the clustered documents, and generating a cluster-classification diagram according to the classified search results and the generated cluster diagram. The outputting module is configured for outputting the generated cluster-classification diagram.

Another preferred embodiment provides a method for searching information and displaying search results. The method includes: (a) receiving one or more keywords; (b) obtaining search results according to the one or more keywords, the search results comprising one or more documents; (c) confirming at least one cluster name according to the search results, and clustering each of the one or more documents in the search results into a corresponding cluster name; (d) classifying each document in the search results into a corresponding field, and thus obtaining classified search results; (e) generating a cluster diagram according to the at least one cluster name and the clustered documents, and generating a cluster-classification diagram according to the classified search results and the generated cluster diagram; and (f) outputting the generated cluster-classification diagram.

Other advantages and novel features of the present invention will become more apparent from the following detailed description of preferred embodiments when taken in conjunction with the accompanying drawings.

DETAILED DESCRIPTION OF THE INVENTION

Figure 1:
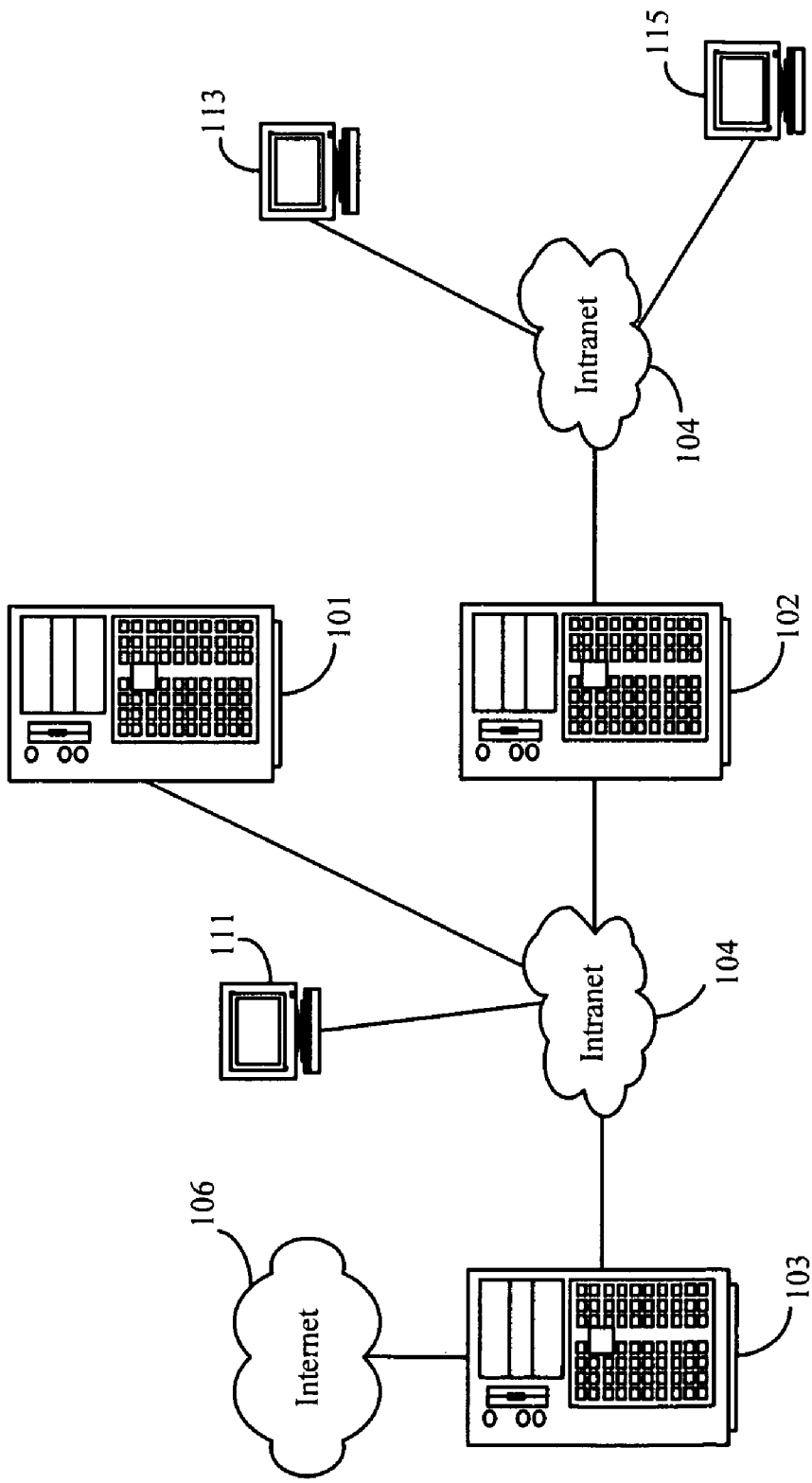
FIG. 1 is a schematic diagram of hardware configuration and an application environment of a system for searching information and displaying search results in accordance with a preferred embodiment.

FIG. 1 is a schematic diagram of hardware configuration and an application environment of a system for searching information and displaying search results (hereinafter "the system") in accordance with a preferred embodiment.

The system is typically configured in a three-layer framework. The three-layer framework includes a data access layer, a business logic layer, and a presentation layer. The data access layer includes an index server 103. The business logic layer includes a search server 102. The presentation layer includes a web server 101 and a plurality of client computers. For the purpose of conveniently illustrating the preferred embodiment of the present invention, three client computers 111, 113, 115 are shown and described hereinafter. An intranet 104 interconnects all the above-mentioned apparatuses.

The client computers, each of which provides an interface of the system, are configured for submitting one or more keywords inputted by a user, and displaying results after performing a search for such keywords.

The web server 101 is configured for receiving the keywords submitted by the client computers, and returning the results to the client computers.

The search server 102 is configured for searching the index server 103 according to the keywords received by the web server 101.

The index server 103 connects with the internet 106, and is configured for retrieving documents from the internet 106, and constructing indexes based on the documents. The documents can be web pages, news, pictures and so on.

Figure 2:
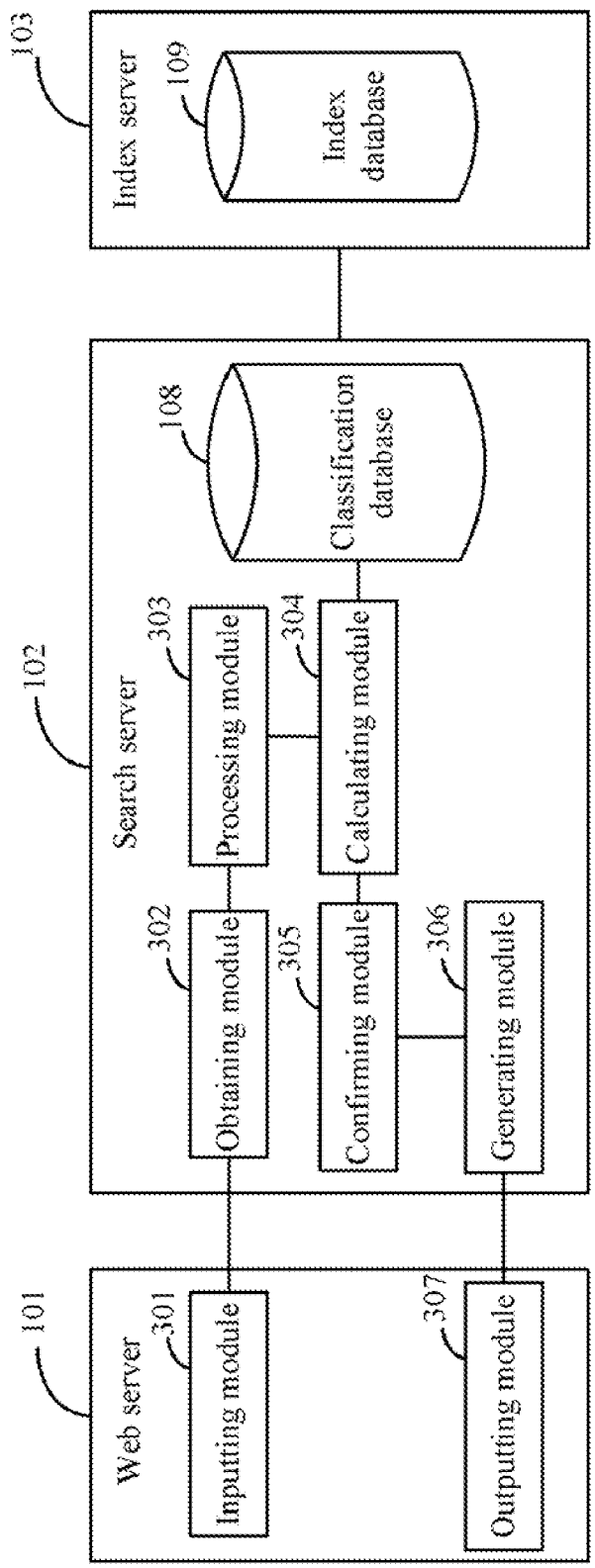
FIG. 2 is a schematic diagram showing main function modules of a web server, a database server, and an index server in FIG. 1.

FIG. 2 is a schematic diagram of main function modules of the web server 101, the search server 102, and the index server 103. The web server 101 includes an inputting module 301 and an outputting module 307. The search server 102 includes an obtaining module 302, a processing module 303, a calculating module 304, a confirming module 305, a generating module 306, and a classification database 108. The classification database 108 is configured for storing corpora of various fields and building language modules correspondingly. The index server 103 includes an index database 109. The index database 109 is configured for storing all the constructed indexes.

The inputting module 301 is configured for receiving one or more keywords, which are inputted by a user from one of the client computers.

The obtaining module 302 is configured for obtaining search results according to the keywords received. The search results consist of one or more documents. In detail, the obtaining module 302 obtains the search results according to the keywords from the cache of the search server 102 first. If the search result cannot be obtained from the cache, the obtaining module 302 searches the index database 109 according to the keywords, and obtains the search results.

The processing module 303 is configured for preprocessing the search results, such as defining thresholds, segmenting, and filtering out stop words. The thresholds include a cluster-name threshold and a correlation threshold. The segmenting is dividing the documents into words. The stop words at least include articles, adverbs, and quantifiers, such as "a", "the", "this", and so on.

The calculating module 304 is configured for calculating a weight of each word of the documents by utilizing the formula TF-IDF (term frequency—inverse document frequency): Weight $(t,d)=TF(t,d)*Log(N/N_t)$. $TF(t,d)$ denotes a frequency of the word t in the document d. $Log(N/N_t)$ here denotes the IDF. N denotes a total number of the documents in the search results. $N_t$ denotes a number of the documents that contain the word t in the search results.

The confirming module 305 is configured for confirming cluster names. Specifically, the confirming module 305 firstly compares each calculated weight and the defined cluster-name threshold, and selects the words that reach the cluster-name threshold; secondly, deletes punctuations in the words that reach the cluster-name threshold; thirdly, filters the words, which reach the cluster-name threshold, according to the longest-word principle, so as to confirm cluster names. The longest-word principle is that the longer word is always more representative. For example, assuming that there are two words "station" and "train station" after the above two steps, the confirming module 305 filters the word "station", and confirms the word "train station" as a cluster name.

The calculating module 304 is further configured for calculating a correlation between each cluster name and each document in the search results by utilizing the formula of the TF-IDF.

The confirming module 305 is further configured for clustering each document that reaches the correlation threshold into a corresponding cluster name.

The calculating module 304 is further configured for making a probability analysis between each document and each language module. In detail, the calculating module 304 calculates a probability of each document occurring in each language module as followings: P(FC|Input)=P(FC, Input)/P (Input). "Input" denotes a document in the search results. "FC (field class)" denotes a language module. "P(Input)" is $\Sigma_{FC}P$ (FC,Input) i.e.

The confirming module 305 is further configured for classifying each document into a corresponding field according to the probabilities calculated, and thus obtaining classified search results. In this preferred embodiment, the classified search results are stored in a hash table.

Figure 6:
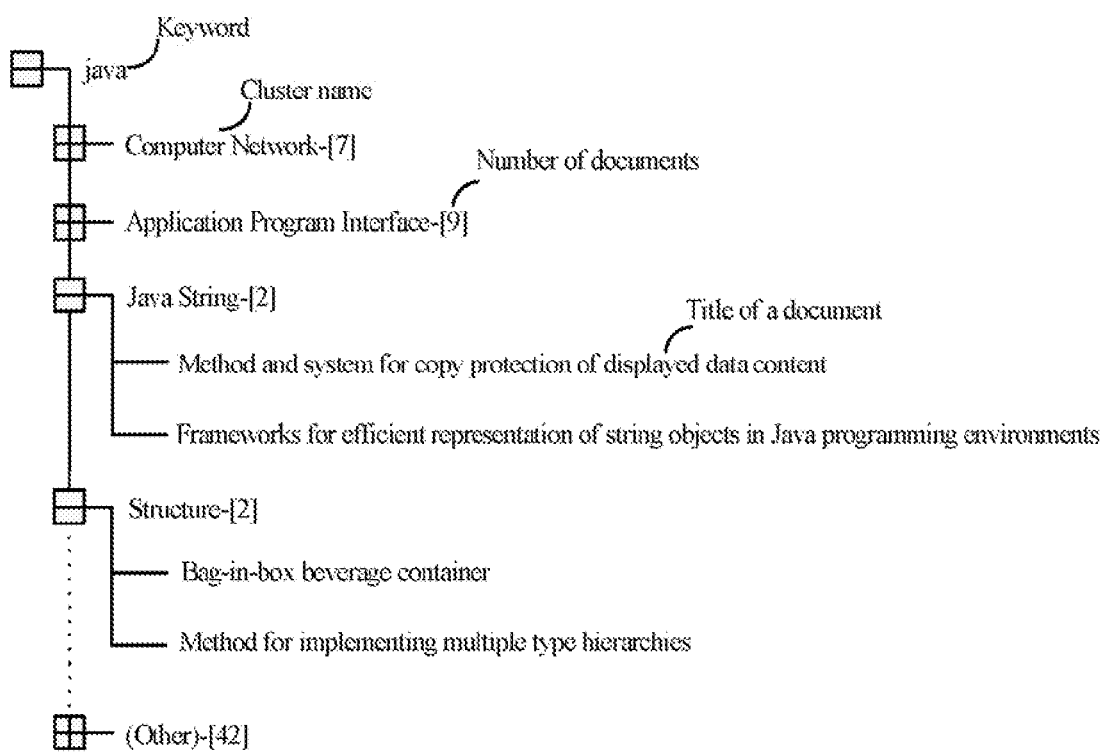
FIG. 6 is an exemplary cluster diagram of search results.
Figure 7:
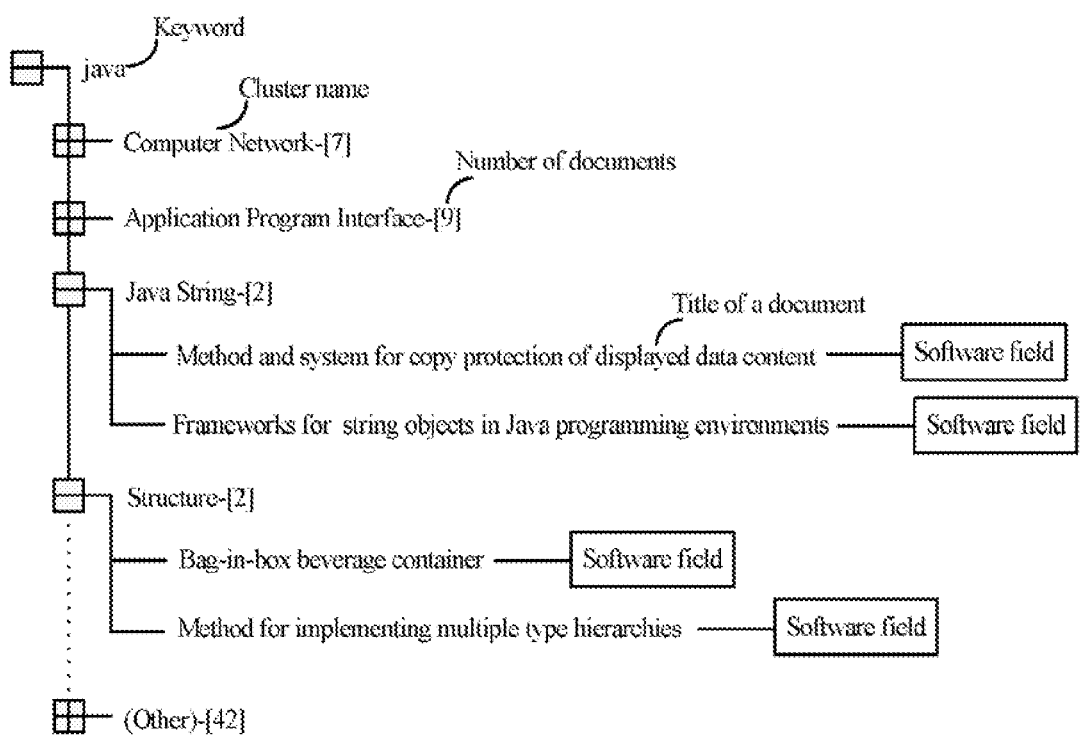
FIG. 7 is an exemplary cluster-classification diagram of the search results.

The generating module 306 is configured for generating a cluster diagram (referring to FIG. 6) according to the cluster names and the clustered documents, and generating a cluster-classification diagram (referring to FIG. 7) according to the classified search results and the generated cluster diagram.

The outputting module 307 is configured for outputting the generated cluster-classification diagram to the client computers, so as to display the search results to the user systematically.

Figure 3:
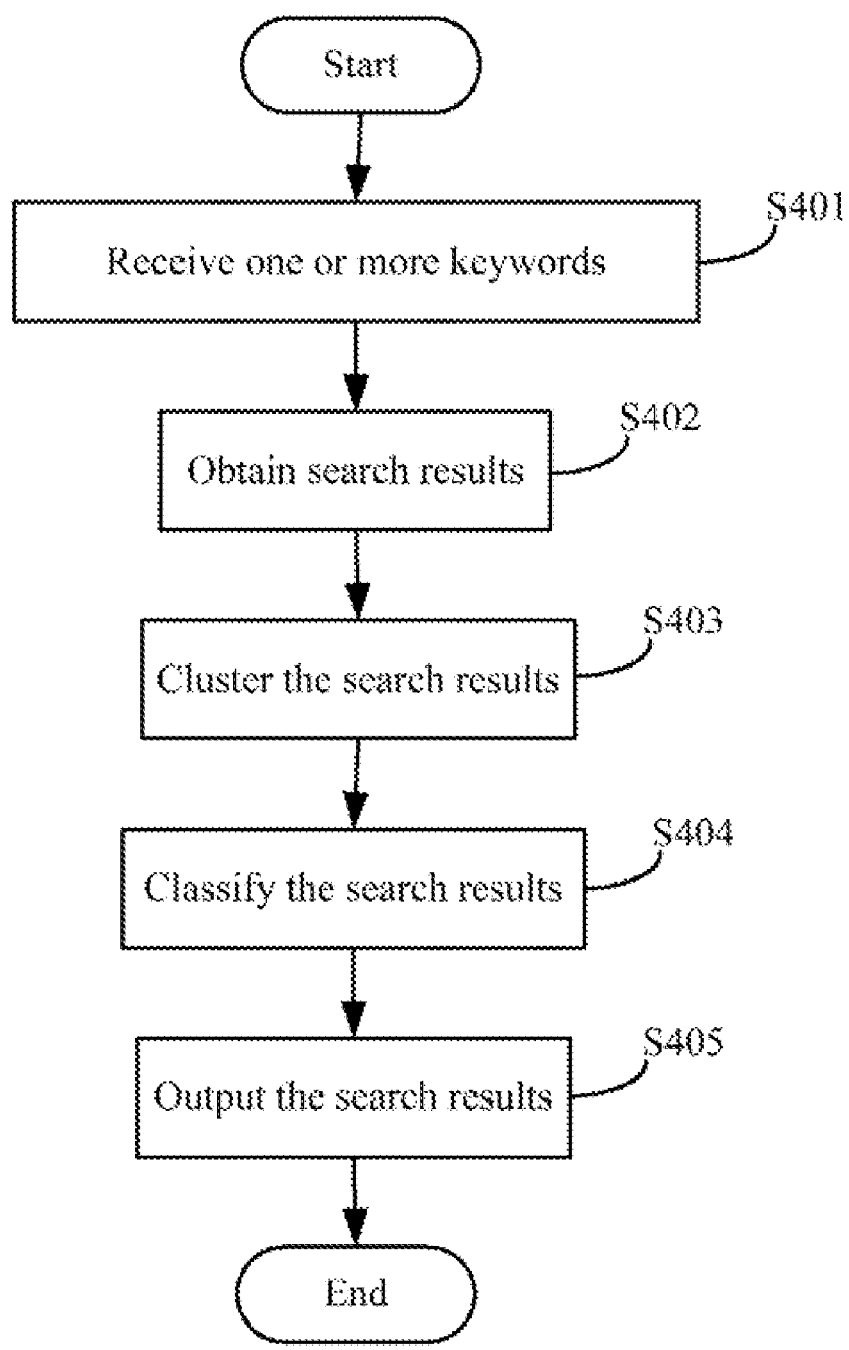
FIG. 3 is a flow chart of a preferred method for searching information and displaying search results by utilizing the system of FIG. 1.

FIG. 3 is a flow chart of a preferred method for searching information and displaying search results.

In step S401, the inputting module 301 receives one or more keywords, which are inputted by a user from one of the client computers.

In step S402, the obtaining module 302 obtains search results according to the keywords received. The search results include one or more documents. In detail, the obtaining module 302 obtains the search results according to the keywords from the cache of the search server 102 first. If the search result cannot be obtained from the cache, the obtaining module 302 searches the index database 109 according to the keywords, and obtains the search results.

In step S403, the confirming module 305 clusters the search results. The generating module 306 generates a cluster diagram according to the clustered search results (details are described in FIG. 4).

In step S404, the confirming module 305 classifies the search results. The generating module 306 generates a cluster-classification diagram according to the classified search results and the generated cluster diagram (details are described in FIG. 5).

In step S405, the outputting module 307 outputs the generated cluster-classification diagram to the client computers, so as to display the search results to the user systematically.

Figure 4:
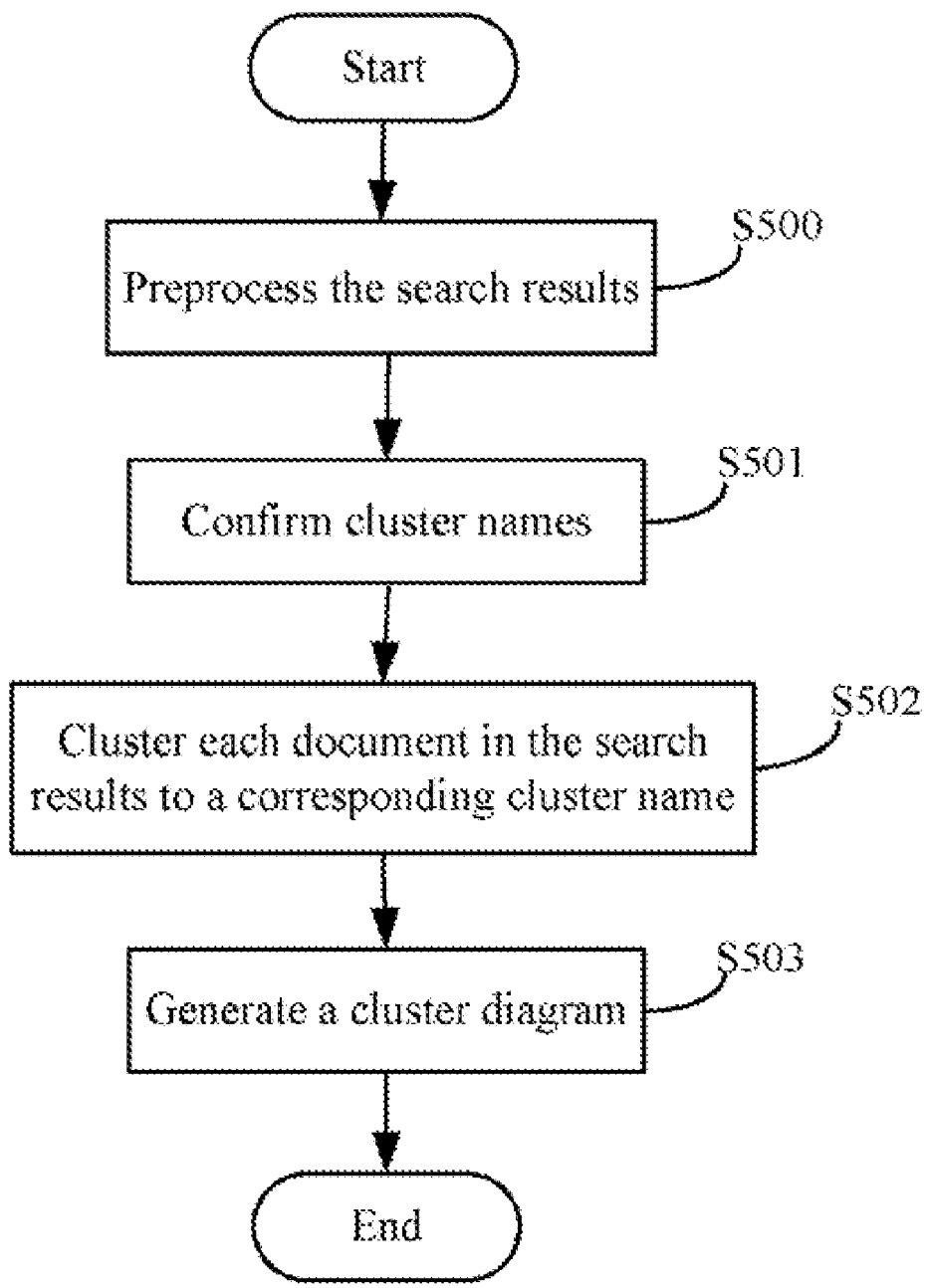
FIG. 4 is a flow chart of details of step S403 of FIG. 3.

FIG. 4 is a flow chart of details of step S403 of FIG. 3.

In step S500, the processing module 303 preprocesses the search results, such as defining thresholds, segmenting, and filtering out stop words. The thresholds include a cluster-name threshold and a correlation threshold. The segmenting is dividing the documents into words. The stop words at least include articles, adverbs and quantifiers, such as "a", "the", "this", and so on.

In step S501, the confirming module 305 confirms cluster names. In detail, firstly, the calculating module 304 calculates a weight of each word of the documents by utilizing the formula TF-IDF (term frequency—inverse document frequency): Weight $(t,d)=TF(t,d)*Log(N/N_t)$. $TF(t,d)$ denotes a frequency of the word t in the document d. $Log(N/N_t)$ here denotes the IDF. N denotes a total number of the documents in the search results. $N_t$ denotes a number of the documents that contain the word t in the search results. Secondly, the confirming module 305 compares each calculated weight and the defined cluster-name threshold, and selects the words that reach the cluster-name threshold. Thirdly, the confirming module 305 deletes punctuations in the words that reach the cluster-name threshold. Fourthly, the confirming module 305 filters the words, which reach the cluster-name threshold, according to the longest-word principle, so as to confirm cluster names. The longest-word principle is that the longer word is always more representative. For example, assuming that there are two words "station" and "train station" after the above three steps, the confirming module 305 filters the word "station", and confirms the word "train station" as a cluster name.

In step S502, the confirming module 305 clusters each document in the search results into a confirmed cluster name. Specifically, the calculating module 304 calculates a correlation between each cluster name and each document in the search results by utilizing the formula of the TF-IDF. The confirming module 305 clusters each document that reaches the correlation threshold into a corresponding cluster name.

In step S503, The generating module 306 generates a cluster diagram (referring to FIG. 6), according to the cluster names and the clustered documents.

Figure 5:
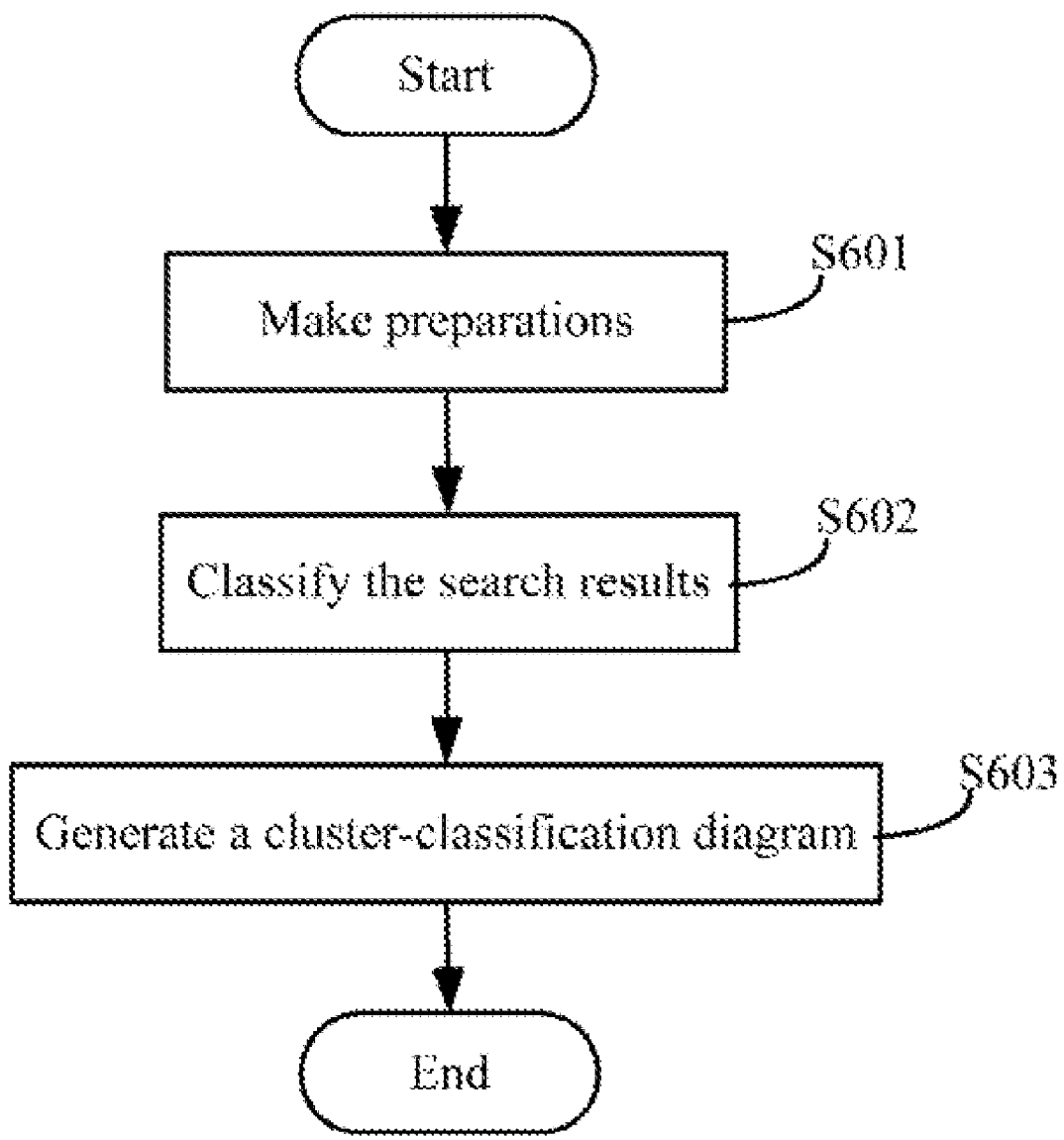
FIG. 5 is a flow chart of details of step S404 of FIG. 3.

FIG. 5 is a flow chart of details of step S404 of FIG. 3.

In step S601, the classification database 108 should be trained in advance: corpora of various fields are inputted in the classification database 108, and language modules are built correspondingly. The corpora include electronic corpus, mechanical corpus, medical corpus, software corpus, and so on.

In step S602, the confirming module 305 classifies the search results. In detail, firstly, the calculating module 304 makes a probability analysis between each document and each language module, that is, calculates a probability of each document occurring in each language module as followings: P(FC|Input)=P(FC, Input)/P(Input). "Input" denotes a document in the search results. "FC (field class)" denotes a language module. "P(Input)" is $\Sigma_{FC}P(FC,Input)$ i.e. Secondly, the confirming module 305 classifies each document into a corresponding field according to the probabilities calculated. Thirdly, the confirming module 305 obtains the classified search results. In this preferred embodiment, the classified search results are stored in a hash table.

In step S603, the generating module 306 generates a cluster-classification diagram (referring to FIG. 7), according to the classified search results and the generated cluster diagram.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system for searching information and displaying search results, the system comprising:
    a web server comprising an inputting module that receives one or more keywords input from one or more client computers; and
    a search server comprising:
    an obtaining module that obtains search results according to the one or more keywords from a cache of the search server or from an index database, the search results comprising one or more documents;
    a calculating module that calculates a weight of each word of the documents in the search results, calculates a correlation between each cluster name and each document in the search results, and calculates a probability of each document occurring in each language module;
    a confirming module that confirms at least one cluster name according to the search results by comparing each weight and a defined cluster-name threshold, selecting the words that reach the defined cluster-name threshold, and deleting punctuations in the words that reach the defined cluster-name threshold according to a longest-word principle, and clusters each of the one or more documents in the search results into a corresponding cluster name according to the correlation, classifies each document in the search results into a corresponding field according to the probability, and thus obtains classified search results;
    a generating module that generates a cluster diagram according to the at least one cluster name and the clustered documents, and generates a cluster-classification diagram according to the classified search results and the generated cluster diagram;
    the web server further comprising an outputting module that outputs the generated cluster-classification diagram to the one or more client computers.

2. The system according to claim 1, wherein the search server further comprises:
    a processing module that preprocesses the search results, the preprocessing comprising defining thresholds; and
    a classification database that stores language modules of various fields.

3. The system according to claim 2, wherein the thresholds comprise the cluster-name threshold and a correlation threshold.

4. A computer-based method for searching information and displaying search results, the method comprising:
    receiving one or more keywords input from one or more client computers;
    obtaining search results according to the one or more keywords from a cache of the search server or from an index database, the search results comprising one or more documents;
    calculating a weight of each word of the documents in the search results;
    confirming at least one cluster name according to the search results by comparing each weight and a defined cluster-name threshold, selecting the words that reach the defined cluster-name threshold, and deleting punctuations in the words that reach the defined cluster-name threshold according to a longest-word principle;
    calculating a correlation between each cluster name and each document in the search results;
    clustering each of the one or more documents in the search results into a corresponding cluster name according to the correlation;
    calculating a probability of each document occurring in each language module;
    classifying each document in the search results into a corresponding field according to the probability, and thus obtaining classified search results;
    generating a cluster diagram according to the at least one cluster name and the clustered documents, and generating a cluster-classification diagram according to the classified search results and the generated cluster diagram; and
    outputting the generated cluster-classification diagram to the one or more client computers.

5. The method according to claim 4, before calculating a weight of each word of the documents in the search results, the method further comprising:
    preprocessing the search results, the preprocessing comprising defining thresholds, the thresholds comprising the cluster-name threshold and a correlation threshold.

6. The method according to claim 4, before classifying each document in the search results into a corresponding field according to the probability, the method further comprising:
    inputting corpora of various fields in a classification database, and building language modules correspondingly, the corpora of various fields comprising electronic corpus, mechanical corpus, medical corpus, and software corpus.

* * * * *